United States Patent [19]

Anderson et al.

[11] Patent Number: 5,404,903
[45] Date of Patent: Apr. 11, 1995

[54] SMART VENT VALVE FOR CARGO TANKS EMPLOYED IN TRANSPORTING HAZARDOUS COMMODITIES

[75] Inventors: Todd W. Anderson, Cincinnati; Richard L. Fahl, Fairfield, both of Ohio

[73] Assignee: Dover Corporation, New York, N.Y.

[21] Appl. No.: 54,389

[22] Filed: Apr. 28, 1993

[51] Int. Cl.⁶ .................................... F16K 17/04
[52] U.S. Cl. .................. 137/514.3; 137/516.27; 220/203; 220/208
[58] Field of Search .............. 137/514.3, 514.5, 514.7, 137/516.27; 220/203, 208

[56] References Cited

U.S. PATENT DOCUMENTS

| | | | |
|---|---|---|---|
| 2,361,881 | 10/1944 | Sheppard | 137/514.7 |
| 2,880,750 | 4/1959 | Amison | 137/516.27 X |
| 5,048,553 | 9/1991 | Vandevyver | 137/514.3 X |
| 5,246,027 | 9/1993 | Morris | 220/203 X |

Primary Examiner—Robert G. Nilson
Attorney, Agent, or Firm—Kinney & Schenk

[57] ABSTRACT

A "smart vent" valve is mounted on a liquid storage tank employed in the transportation of liquid. The valve prevents overpressurization of the tank due to increases in vapor pressure and prevents discharge of liquid through the valve in response to pressure surges caused by accidental overturning of the tank. A valve member is provided for a vent opening. Sealing engagement is maintained between the valve member and the vent opening during a finite period of valve member travel caused by an increase in pressure within the tank. The rate of valve member travel is limited by hydraulic system in which hydraulic fluid is forced through orifices from one chamber to another. The high levels of pressure surges do not have sufficient duration to displace the valve member a distance sufficient to move it to a position in which the vent opening is unsealed and liquid could escape therefrom.

14 Claims, 6 Drawing Sheets

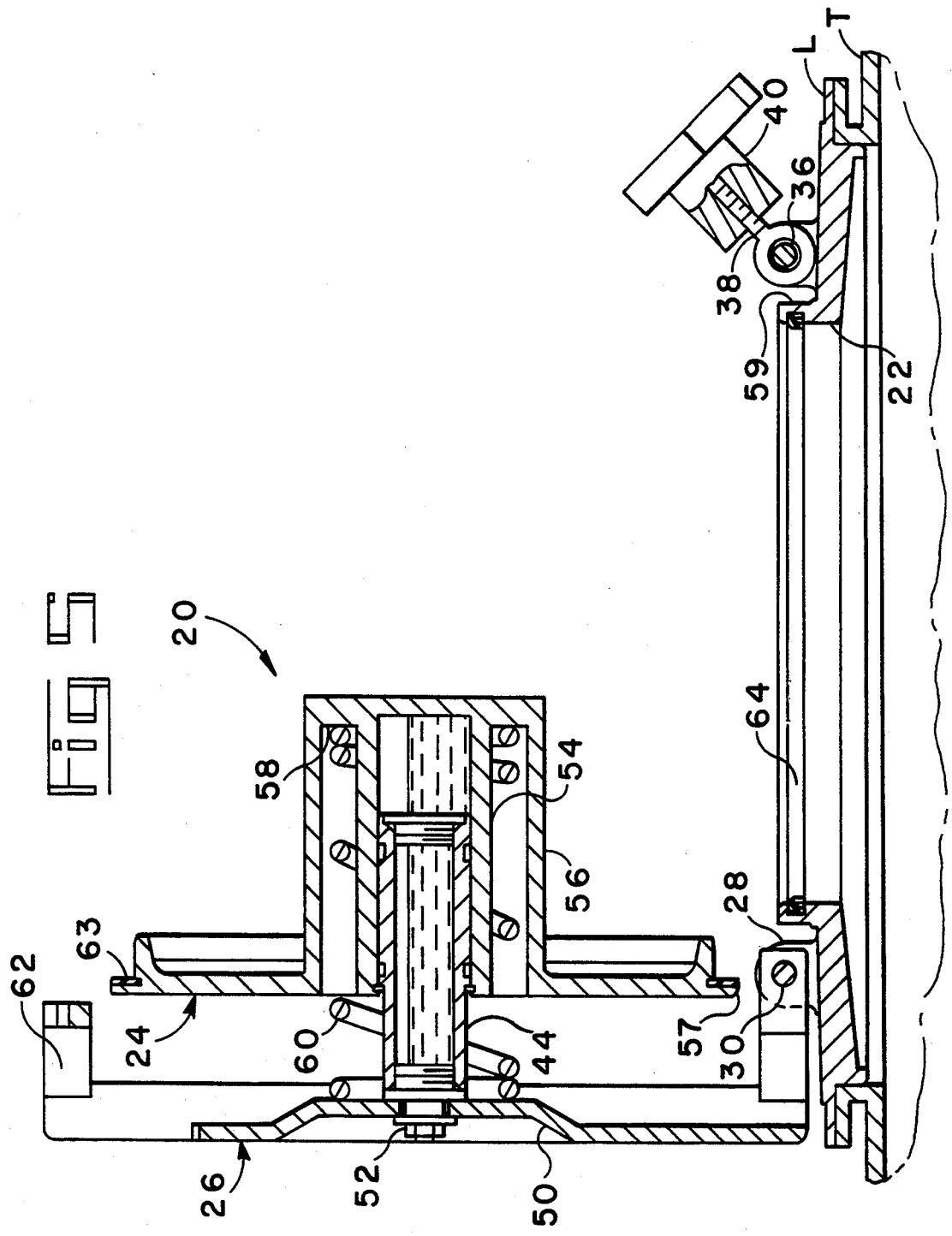

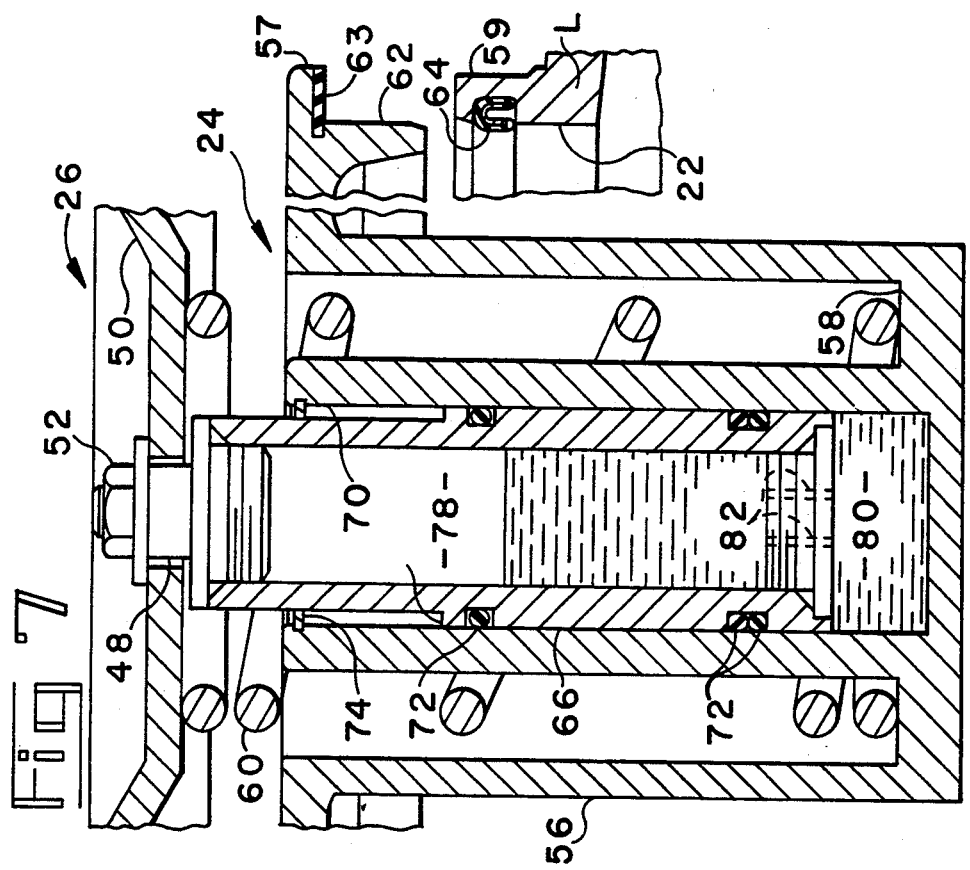
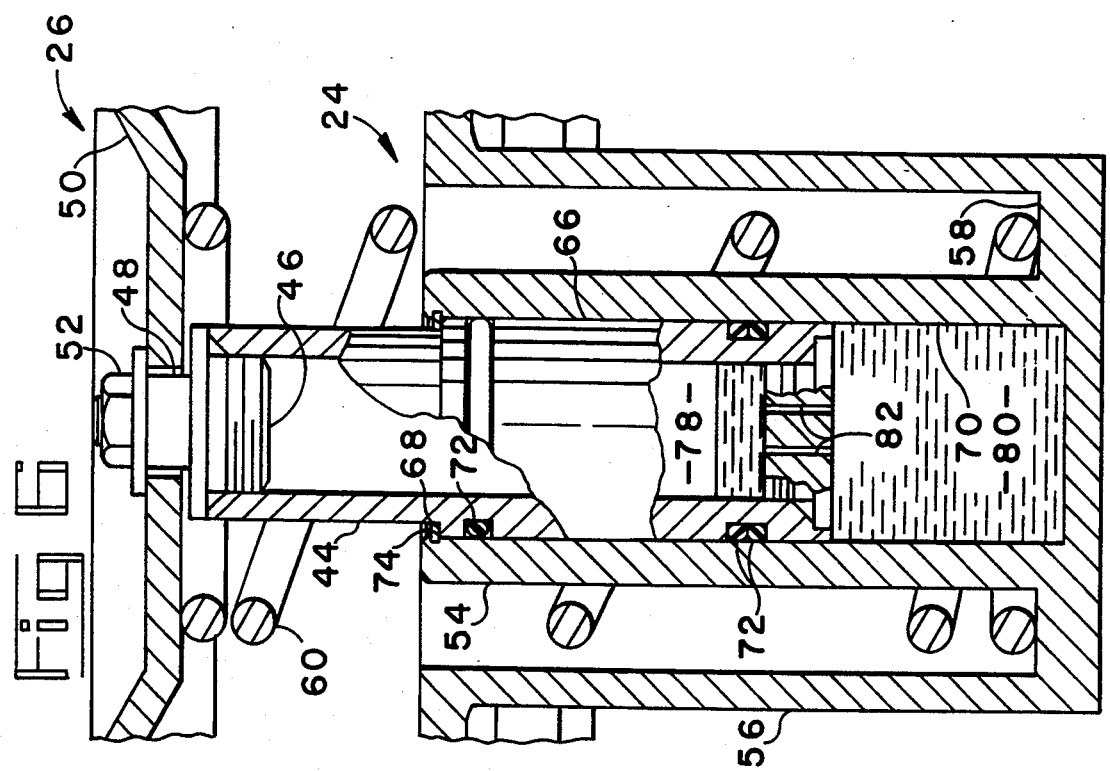

SMART VENT VALVE FOR CARGO TANKS EMPLOYED IN TRANSPORTING HAZARDOUS COMMODITIES

The present invention relates to improvements in vent valves employed in cargo tanks in transporting hazardous commodities, and more particularly to such vent valves that remain closed when subjected to sudden surges in pressure, as occur when a tank is overturned, such vent valves being commonly referenced as smart vents.

Fuel and other potentially hazardous liquid commodities are commonly transported from one location to another in a tank car over a roadway or a railway. In either mode of transportation it is necessary to provide a vent valve to release vapors when a given pressure is exceeded to thereby prevent overpressurization that would cause the tank to rupture. Rupture of a tank results not only in a loss of the cargo, but, of even greater economic impact can be the clean up costs to eliminate contamination from spilled hazardous products.

Likewise, whether transported by rail or over the road, there is always the possibility of an accident in which a cargo tank overturns. When this occurs, there is a sudden and short-lived surge pressure, as the liquid cargo initially shifts in the tank. Vent valves, which may also be accurately referred to as pressure relief valves, are a basic type of valve mechanism and generally comprise a valve member which is maintained in a closed, sealed position on the tank outlet by resilient means, usually a compression spring. When the internal tank pressure creates a force on the valve member exceeding the force of the resilient means, the valve member is displaced to an open position.

It is obvious that such a standard vent valve is incapable of preventing the escape of liquid from a tank when subject to the extreme surge pressures that are incident to the tank being overturned, or suddenly displaced to a substantial degree from its normal upright position. Conventional vent valves therefore do not prevent spillage of hazardous commodities under such conditions and do not meet the need to prevent, or substantially minimize the likelihood of contamination from hazardous materials in their transportation.

The problem of providing a vapor vent valve to prevent overpressurization, which also prevents escape of hazardous liquid has been recognized in the past and several vent valve constructions have been proposed for satisfying such ends.

A recent proposal for such a valve is found in U.S. Pat. No. 5,048,553. Other valves for this purpose are found in U.S. Pat. Nos. 4,508,131 and 4,555,041. These valves have in common the feature that they are attitude responsive. That is, in one fashion or another, such valves include an element which shifts to a position wherein opening of the vent valve is prevented, when the tank is overturned or its position (attitude) is substantially shifted from an upright position.

Such attitudinal mode of operation is satisfactory in many cases, however it is based on a secondary parameter. This is to say that, in the event of a tank car being overturned, there is a sudden shifting of a liquid cargo and, possibly a collapse of the tank, all of which can occur with the tank car overturning to an inverted position, or only to a slightly angled position. In either case, the shifting liquid cargo can exert a sharply peaked surge pressure, that can be in the order of 30 pounds per square inch or more. This surge pressure is sufficient to open and discharge a substantial and potentially hazardous amount of liquid through a conventional vent valve, which is set to open at a pressure of a few pounds per square inch.

The prior art "smart valves", are not fully satisfactory in that they do not act, or react, with sufficient speed to prevent escape of liquid. This is to point out that the attitudinally responsive, control element may not move rapidly enough to lock the vent valve in a closed position, before the surge pressure has caused liquid to be discharged therethrough. This problem is particularly acute in the case where a tank car shifts only a few degrees and yet, there is a substantial surge pressure acting on the vent valve.

Accordingly, the primary object of the present invention is to provide a "smart vent" valve which more reliably prevents release of liquids in response to surge pressures incident to a tank car being overturned.

Another object of the present invention is to achieve the foregoing end in an economical fashion.

These ends may be broadly attained by a "smart vent" valve adapted to be mounted on a liquid storage tank employed in the transportation of liquid.

The "smart vent" valve comprises a vent opening adapted to be disposed in the upper portion of the tank, above the normal level of liquid therein. A valve member mounted for movement between an open position, in which fluids may pass outwardly from the tank, and a closed position, in which the vent opening is sealed to prevent fluids from passing outwardly from the tank. The valve member is yieldingly maintained in this closed position and is responsive to the vapor pressure within said tank exceeding a given level, to displace said valve member to its closed position.

This valve is characterized by means for preventing the valve member from being displaced to its open position in response to surge pressures of short duration. Such surge pressures are independent of any change in the orientation of the tank, as would occur in the tank's being overturned.

In accordance with more specific aspects of the invention, the foregoing ends may be achieved by a "smart vent" valve, as above characterized, wherein the "smart vent" valve comprises means defining the vent opening. The valve member is mounted for movement successively from a "first" position to a "second" position and then to a "third" position in which the vent opening is open and fluid may flow outwardly from said tank.

The "smart vent" valve may be further characterized by means providing a seal between the valve member and the means defining a vent opening, during movement of the valve member between its "first" and "second" positions. Additionally, means for limiting the rate of relative movement between the valve member and the vent opening are provided so that the rate of movement of the valve member, from its "first" position to its "second" position, is substantially less than if such movement were directly proportional to the pressure within the tank.

In this fashion, the valve will not be displaced to its "third" position, in response to surge pressures of high magnitude and short duration and liquid will not be discharged through the vent opening in response to pressure surges.

Further, the vent opening may be defined by a tubular element. The valve member is preferably mounted for reciprocable movement, axially of said vent opening, from a "first" position to a "second" position and then a "third" position in which the vent opening is open and fluid may flow outwardly from said tank.

The valve member may be provided with a cylindrical surface which is in sealing relation with the vent opening as the valve member is moved between its "first" and "second" positions. Spring means urge the valve member inwardly, with respect to said tank, to its "first" position. The lower surface of the valve member is exposed to the pressure within said tank, so that, when the vapor pressure force on the lower surface of the valve member exceeds the spring force thereon, the valve member will be displaced outwardly to its "third" position, in which vapor will be vented to avoid overpressurization of the tank.

Hydraulic, orifice means limit the rate at which the valve member is displaced from its "first" position to its "second" position. With this arrangement, the valve member will not be displaced to its open, "third" position in response to high pressure surges of relatively short duration.

The above and other objects and features of the invention will be apparent from a reading of the following description of a preferred embodiment, with reference to the accompanying drawings, and the novelty thereof pointed out in the appended claims.

In the drawings:

FIG. 5 is a section, as in FIG. 3, on a reduced scale, showing the "smart vent" swung to a position providing access to the interior of the tank;

FIG. 6 is a section similar to FIG. 3, showing a control piston is section and on an enlarged scale; and FIG. 7 is a section similar to FIG. 6, showing the control piston positioned in the venting position of the vent valve.

Figure 1:
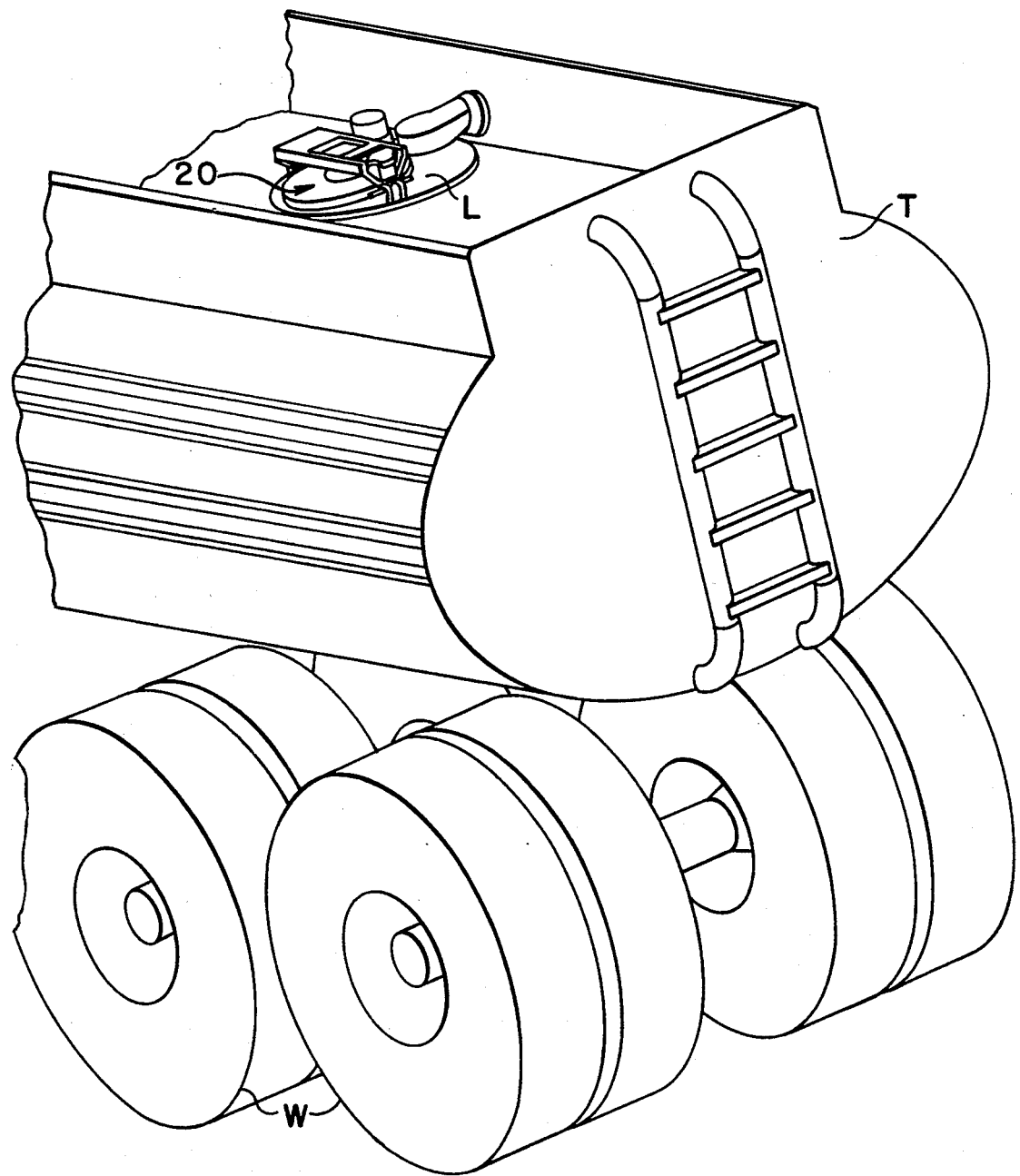
FIG. 1 is a fragmentary, perspective view of the rear portion of a tank car, illustrating the installation of a "smart vent" embodying the present invention.
Figure 2:
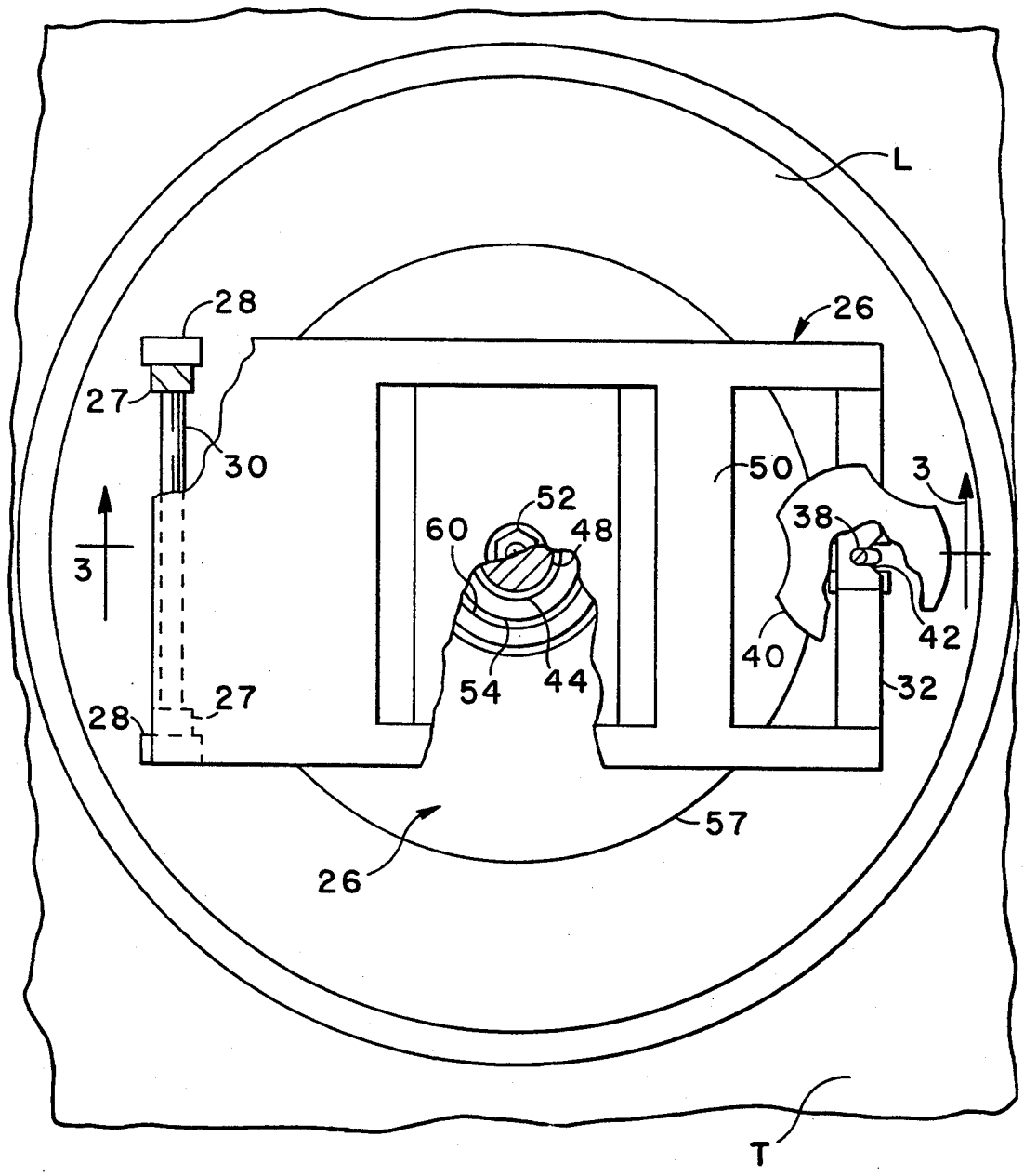
FIG. 2 is a plan view of the "smart vent" seen in FIG. 1.

FIG. 1 illustrates the rear end of a tractor trailer, tank car as used in over the road transportation of liquid fuels, this being one environment in which the "smart vent" of the present invention may be employed. The tank car comprises an elongated tank T, which is suitably mounted on wheels W. The "smart vent" of the present invention is indicated generally by reference character 20 and is mounted so that it communicates with the upper portion of the of the tank's interior, namely the portion of the tank above the level to which tank is normally filled. Such space being filled by fuel vapor. This end is conveniently attained by mounting the "smart vent" 20 on a lid L which overlies and normally closes off a manhole opening M in the upper surface of the tank T.

Figure 3:
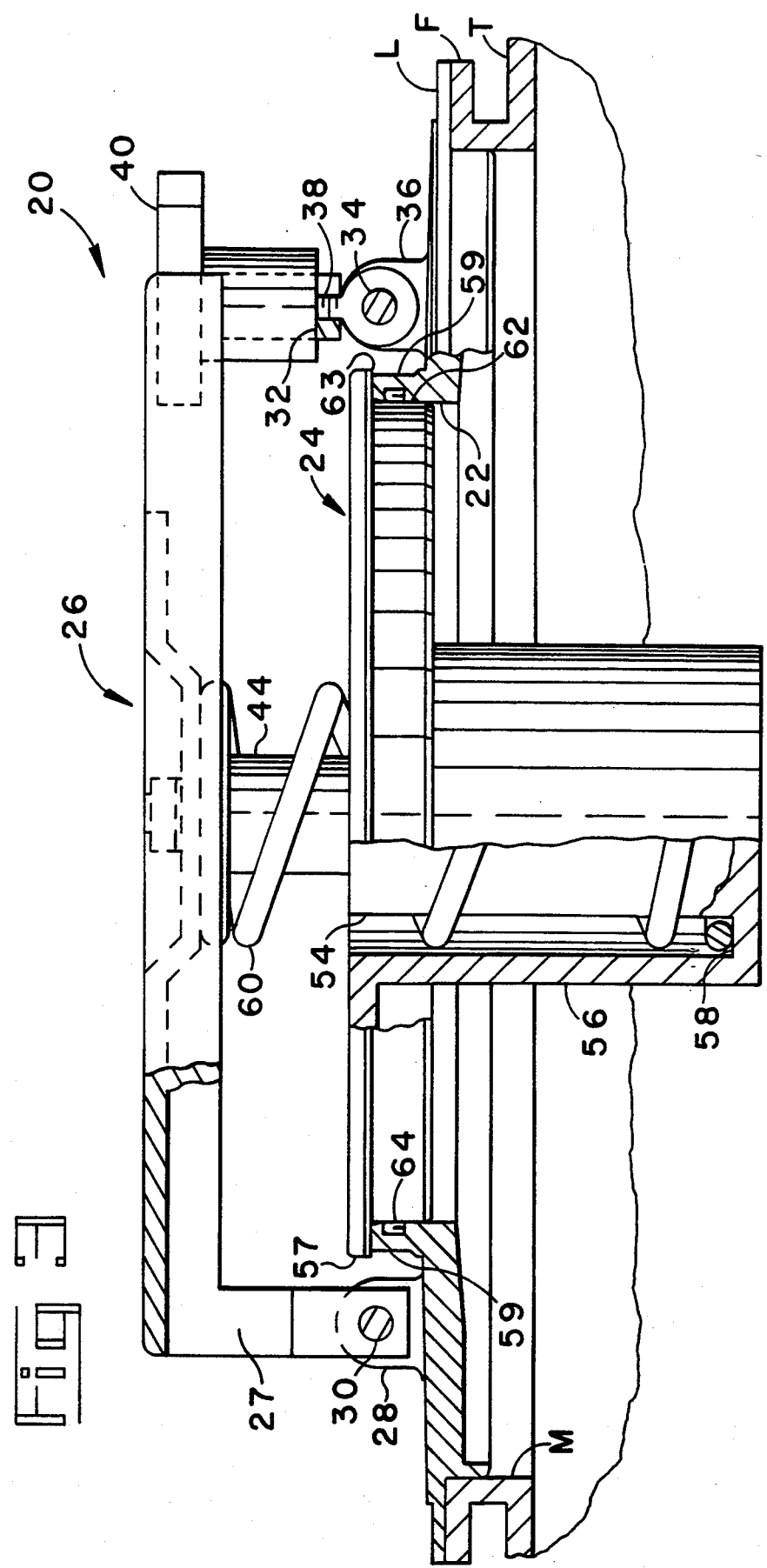
FIG. 3 is a section taken generally on line 3—3 in FIG. 2, showing the "smart vent" in its closed position.

This is further illustrated in FIG. 3, where it will be seen that the upper end of the manhole M is defined by a flange F. The lid L is supported on the flange F and is secured in sealing relation thereon by means that are not illustrated.

Figure 4:
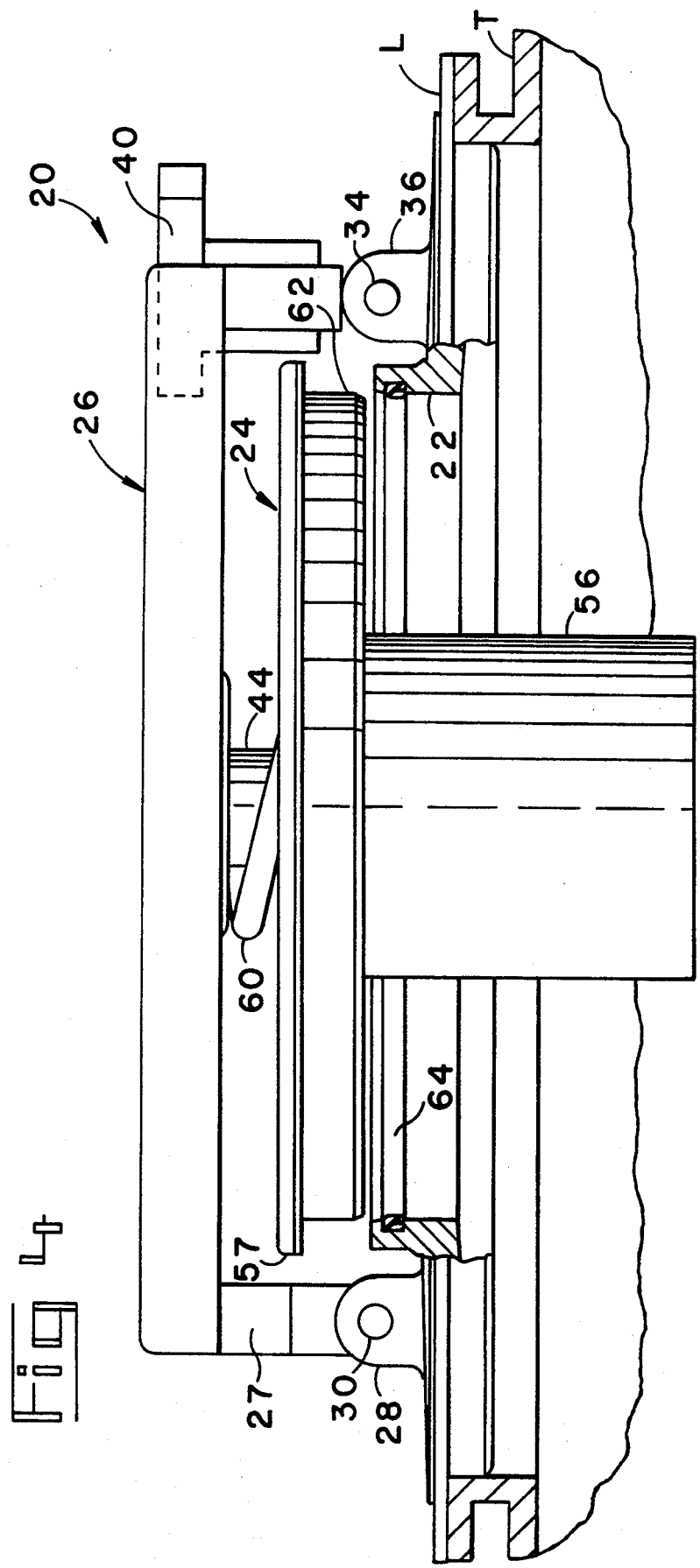
FIG. 4 is a section, as in FIG. 3, showing the "smart vent" in its venting position.

The "smart vent" 20 comprises an opening 22, formed in the manhole lid L and a valve member 24 displaceable between a closed position (FIG. 3) and a venting position (FIG. 4). The valve member 24 is mounted on a manhole bracket 26, which is normally maintained in a fixed position.

The bracket comprises, at one end a pair of depending legs 27, which are disposed between lugs 28, which project upwardly from the lid L. A pin 30 pivotally mounts the legs 26 relative to the lugs 30 and the lid L. The opposite side of the bracket 26 includes a cross bar 32, which is adapted to be clamped with respect to a rod 34, that extends between lugs 36 projecting upwardly from the lid L. More specifically, an eye bolt is provided on the rod 34, with the bolt portion extending upwardly. A knob 40 is threaded onto the eye bolt 38 and engages the upper surface of the cross bar 32.

The bracket 26 may be swung to the position of FIG. 5, to provide access to the interior of the tank T, through the vent opening 22. To this end the cross bar 32 is provided with a notch 42, that permits the eyebolt 38 to be swung away from the cross bar 32 after loosening of the knob 40. Once the eye bolt 38 is clear of the cross bar 32, the manhole bracket may be swung to the position of FIG. 5, permitting access to the interior of the tank, through the vent opening 22.

The valve member 24 is slidably mounted on a tubular post, or piston 44, that is secured to and depends from the relatively fixed manhole bracket 26 (FIGS. 3 and 5). More specifically, a mounting plug 46 is threaded into the upper end of the piston 44. The plug has a shoulder portion 48 that extends through an opening in a depressed portion of a cross plate 50, that is formed as an integral part of the manhole bracket 26. A nut 52, threaded onto the upper end of the plug 46 maintains the piston in mounted relation on the manhole bracket 26. It is to be noted that this mounting permits limited movement of the piston 44, relative to the bracket 26. This relative movement permits the use of relatively large tolerances in manufacturing the components of the "smart vent" 20, while achieving a sealing relation with the vent opening 22.

The tubular piston 44 is slidingly received in a cylinder 54. The cylinder 54 may be an integrally formed component of the valve member 24. Concentric and outwardly of the cylinder 54 there is a second cylinder 56, which is connected by a base portion 58 to the piston cylinder 54. The upper end of the cylinder 56 connects with an annular disc portion 57 which overlies and engages the upper end of an annular flange 59, that projects upwardly from the lid L in defining the vent opening 22. A spring 60 disposed in the annular recess defined by the two cylinders 54, 56 and acting on the base portion 56 and the lower surface of the relatively fixed cross plate 50, yieldingly maintains the valve member 24 in this lower position, in which the vent opening 22 is closed and sealed.

Closure, or sealing of the vent opening 22, is provided by the outer surface of a depending, cylindrical flange 62, which is telescoped into the circular opening 22. It is preferred that there be two seals between the valve member 24 and the vent opening 22. The first seal may be provided by a gasket ring 63 disposed between the lower surface of the disc portion 57 and the upper surface of the vent opening flange 59. The second seal is between the surface of the depending sealing flange 62 and the vent opening 22. This is a sliding seal, effective over a finite distance of movement of the valve member 24 with respect to the venting opening 22. Such sliding seal may be achieved through use of a sealing ring 64. The sealing ring 64 has a preferred configuration, in which it is formed with an inverted U-shaped cross section, and is formed of an antifriction, synthetic resin, such as polytetraflouroethylene, commonly identified by the trademark Teflon.

The lower end of the piston 44 has an enlarged diameter 66, which is defined, at its upper end by a shoulder 68. The diameter 66 is slidingly received in a bore 70 of the cylinder 54. O-rings 72, provided in grooves formed in the diameter 66, provide a fluid seal between the piston diameter 66 and the bore 70.

A retaining ring (snap ring) 74 is mounted in the outer end of the bore 70 to maintain the valve member 24 in assembled relation on the piston 44. The retaining ring 74 comes into play when the manhole bracket 26 is swung to the position of FIG. 6. In that position, outward movement of the valve member 24, relative to the piston 44, under the urging of spring 60, is limited by engagement of the shoulder 68 with the ring 74. It is to be appreciated that, in the sealing position of FIG. 3, that the valve member is displaced a short distance inwardly, on the piston 44, by engagement of the disc portion 57 engaging the vent opening flange 59. This is evidenced, in FIG. 5., by the spacing of the ring 74 above the shoulder 68.

An orifice plug 76 is threaded into the lower end of the piston 44. The plug 76 separates an upper chamber 78, interiorly of the piston 44, from a lower chamber 80, within the cylinder 54. The chambers 78, 80 are interconnected by small diameter holes, or orifices 82, extending through the orifice plug 76.

It will be seen that the volume of the chamber 80 varies, dependent on the position of the valve member 24 (cylinder 54) relative to the supporting piston 44. The volume of the chamber 80 is greatest when the valve member is extended relative to the it outermost position on the piston 44. This would be the position illustrated in FIG. 5.

The chamber 80 is filled with a hydraulic fluid, or other appropriate liquid after insertion of the piston into the cylinder bore 70 and mounting of the retaining ring 74, through the upper end of the piston 44, before the plug 46 is threaded therein. The amount of hydraulic fluid preferably, would be sufficient to fill the maximum volume of chamber 80. Further amounts of hydraulic fluid may be added to partially fill the upper chamber 78, but, in any event, the chamber 78 should not be completely filled, for reasons developed below.

Functioning of the present "smart vent" is simple and highly effective.

During the transporting of fuel, or when there is otherwise fuel in the tank T, the "smart vent" valve is in operative position and the valve member is in the position, of FIGS. 3 and 6. The under surface of the valve member 24 is subject to vapor pressure within the tank, the surface of the liquid contents of the tank being spaced beneath the vent, in what is a closed chamber.

If there is an increase in vapor pressure, within the tank T, there is an increase in the force on the undersurface of the valve member 24. When this force increases sufficiently, it will overcome the downward force of the spring 60, on the valve member 24, thereby displacing the valve member upwardly. When the valve member 24 is displaced upwardly to a point where the lower end of the flange 62 clears the sealing ring 64, vapor will be vented. By so venting vapor, when its pressure exceeds a predetermined limit it is possible to prevent the pressure in the tank T from reaching a level at which the tank would rupture, or its structural integrity otherwise compromised. This is the normal purpose and function of a transport vent valve.

This normal function is provided in a highly effective manner, or, even an improved manner, while at the same time providing the "smart" function of preventing the valve from opening in response to pressure surges associated with a tank car being overturned.

Reverting again to FIGS. 6 and 7, it will be seen that, as the valve member 24 is displace upwardly to an open position, the volume of chamber 80 decreases and hydraulic fluid is forced through the orifices 82 into the upper chamber 78. The rate of movement of the valve member 24 is a function of the rate at which hydraulic fluid can be forced through the orifices 82, from the lower chamber 80 into the upper chamber 78.

When operating to provide a normal venting function, as where vapor pressure increases due to an increase in ambient temperature, the rate of change in vapor pressure is normally quite slow. The fact that hydraulic fluid has to be forced through the orifices 82, has little or no affect on the rate at which the valve member is displaced to an open position in venting an overpressure condition.

In distinction, surge pressures associated with the overturning of a tank car, are of extremely high magnitudes, but are of a relatively short duration. With the described means for limiting the rate of movement of the valve member 24, notwithstanding a high magnitude, surge pressure, valve member 24 will not be moved a distance sufficient to unseal the vent opening 22, within the short time of a normal surge pressure, this period of time being typically accepted as being in the order of 60 milliseconds.

To recapitulate, upon the tank car being overturned, there will be a high magnitude surge pressure, effective to displace the valve member upwardly. This will unseat the gasket ring 63 from the vent opening flange 59. The vent opening 22 remains sealed however because of the sealing engagement between the flange 62 and the sealing ring 64. This sealing engagement is maintained until the valve member 24 is displaced a distance sufficient to displace the flange 63 to a point where it no longer sealingly engages the ring 64. The point being made is that the duration (milliseconds) of a surge pressure, is insufficient to displace the valve member out of engagement with the longitudinal, sliding seal. Thus, while this sliding seal is still engaged, the pressure will have dissipated, and the internal pressure in the tank will have been reduced to a point such that the opening force on the valve member 24 is less than the force of the spring 60. The valve member 64 is then returned to its fully closed position (FIGS. 3, 6).

For purposes of providing terms of reference, the full closed position of valve member 24, illustrated in FIGS. 3 and 6, may be referenced as a "first" position. As indicated, the valve member is in sealed relation with respect to the vent opening 22. The valve member 24 is displaced outwardly to a "second" position in which it continues to be in sealed relation, by reason of the continued engagement of flange 62 with the seal ring 64. As soon as the flange 62 is raised to a position in which it no longer engages the seal ring 64, the valve member is in its "third" position, in which the vent opening is no longer sealed. The "third" position is the open position of the valve member 24 in which fluid is free to be discharge therethrough.

The significance is that the sealed relationship of the valve member 24 with respect to the vent opening is maintained as the valve member is displaced the finite, and relatively substantial distance between the "first" and "second" positions of the valve member 24.

As discussed, the rate at which hydraulic fluid can be displaced through the orifices 82 limits the rate of movement of the valve member 24. This rate, in combination with the distance between the "first" and "second" positions of the valve member 24, can be set so that the valve member 24 will not be displaced to its open, "third" position, in response to a pressure surge of high magnitude, for a duration of several milliseconds. Typically, as illustrated, the distance between the "first" and "second" positions can be in the order of ½ inch, and incorporated into a compact, economical valve design configuration.

Also for purposes of providing terms of reference, it is to be understood that the sliding sealing means provided by the seal 64 are effective between the "first" and "second" positions of the valve member 24. In the "first" position of the valve member 24, the "fixed" seal means provided by the gasket ring 63 are additionally effective to seal the vent opening 22.

It is, of course, to be appreciated that an increase in the distance between the "first" and "second" positions of the valve member and/or a reduction in the rate of movement of the valve member 24, from its "first" position to its "second" position, will increase the magnitude and/or duration of a surge pressure that will be "contained" without discharge of liquid from the tank, through the vent opening 22.

At this point it will be noted that functioning of the "smart vent" 20 in its venting mode is a relatively frequent occurrence. Functioning in its "smart" mode to prevent unsealing of the vent opening in response to pressure surges is a rare circumstance and usually a one time function.

In theory the present vent valve would provide the described functions employing only the sliding seal comprising flange 62 and sealing ring 64. Sliding seals are, however, prone to leakage. In comparison, the axially clamped sealing gasket 63 provides an highly effective seal having a long working life. Thus, the provision of the "fixed" seal employing gasket 63, with a fixed sealing plane, gives a high level of assurance that there will not be an undesired leakage of vapors, when the valve member is in its closed position (FIG. 3.).

Various departures from the embodiment herein disclosed will occur to those skilled in the art within the spirit and scope of the present inventive concepts. For example, the outer surface of flange 62 is a sealing surface, sealingly engaged by the relatively fixed seal 64. An equivalent structure would be to mount the seal 64 on the flange 62, for engagement with a cylindrical surface defining the vent opening 22. Accordingly the scope of the invention claimed is set forth in the following claims.

Having thus described the invention, what is claimed as novel and desired to be secured by Letters Patent of the United States is:

1. A "smart vent" valve adapted to be mounted on a liquid storage tank employed in the transportation of liquid, said valve being adapted to prevent overpressurization of the tank due to increases in vapor pressure and to prevent discharge of liquid through the valve in response to pressure surges caused by overturning of the tank, said "smart vent" valve comprising a vent opening adapted to be disposed in the upper portion of said tank, above the normal level of liquid therein, a valve member mounted for movement between an open position, in which fluids may pass outwardly from the tank, and a closed position, in which the vent opening is sealed to prevent fluids from passing outwardly from said tank, means for yieldingly maintaining the valve member in its closed position, said means for yieldingly maintaining the valve member in its closed position, being responsive to the vapor pressure within said tank exceeding a given level, to displace said valve member to its open position, characterized by means independent of any change in the orientation of the tank, as would occur in the tank's being overturned, and also independent of liquid pressure thereon, for preventing the valve member from being displaced to its open position in response to a surge pressure of short duration, which surge pressure is substantially higher than the given level of the vapor pressure, at which the valve member is displaced to its open position.

2. A "smart vent" valve adapted to be mounted on a liquid storage tank employed in the transportation of liquid, said valve being adapted to prevent overpressurization of the tank due to increases in vapor pressure and to prevent discharge of liquid through the valve in response to pressure surges caused by overturning of the tank, said "smart vent" valve comprising means defining a vent opening, which is adapted to be disposed in the upper portion of said tank, above the normal level of liquid therein, a valve member mounted for movement successively from a "first" position to a "second" position and then to a "third" position in which the vent opening is open and fluid may flow outwardly from said tank, yieldably means urging said valve towards said "first" position, means responsive to the pressure within said tank for displacing said valve member towards its "third" position, when the pressure exceeds a given level, characterized by means providing a seal between the valve member and the means defining a vent opening, during movement of the valve member between its "first" and "second" positions, and means for limiting the rate of relative movement between the valve member and the vent opening so that the rate of movement of the valve member, from its "first" position to its "second" position, is no less than the rate of movement of the rate of movement of the valve member from its third position to its first position, and such rate of movement is substantially less than if it were directly proportional to the pressure within the tank, whereby, the valve will not be displaced to its "third" position, in response to surge pressures of high magnitude and short duration and liquid is not discharged through the vent opening in response to pressure surges.

3. A "smart vent" valve as in claim 2 wherein, when the valve means is disposed in its "third" position, venting fluid flow is through the vent opening is in an outward direction from the interior of said tank, and further characterized in that the means providing a seal comprise a sliding seal effective as the valve member is displaced between its "first" and "second" positions, and further including a "fixed" seal which is engaged when the valve member is in its "first" position, and further characterized in that the "fixed" seal is downstream of the sliding seal as related to venting flow through said vent opening.

4. A "smart vent" valve adapted to be mounted on a liquid storage tank employed in the transportation of liquid, said valve being adapted to prevent overpressurization of the tank due to increases in vapor pressure and to prevent discharge of liquid through the valve in response to pressure surges caused by overturning of the tank, said "smart vent" valve comprising a tubular element, defining a vent opening, and having an upper discharge end, said tubular element being adapted to be disposed in the upper portion of said tank, above the normal level of liquid therein, a valve member mounted for reciprocable movement axially of said vent opening, from a "first" position to a "second" position and then a "third" position in which the vent opening is open and fluid may flow outwardly from said tank, said valve member having a cylindrical surface which is in sealing relation with the vent opening as the valve member is moved between said "first" and "second" positions, spring means urging the valve member inwardly, with respect to said tank, to said "first" position, the lower surface of said valve member being exposed to the pressure within said tank, whereby, when the vapor pressure force on the lower surface of the valve member exceeds the spring force thereon, the valve member will be displaced outwardly to its "third" position, in which vapor will be vented to avoid overpressurization of the tank, and hydraulic, common orifice means for limiting the rate at which the valve member may be displaced between its "first" position to its "second" position, the rate of movement being the same in directions toward and away from the "first" position, and substantially less, than the rate at which the valve member would be displaced by pressure within the tank, absent the orifice means, whereby the valve member will not be displaced to its open, "third" position in response to high pressure surges of relatively short duration.

5. A "smart vent" valve as in claim 4 wherein a "fixed" seal is provided between the valve member and the discharge end of the tubular element, said "fixed" seal being sealing engaged in the "first" position of the valve member.

6. A "smart vent" valve as in claim 4 wherein the hydraulic orifice means comprise first and second chambers which are interconnected by orifice means and hydraulic fluid must flow from one chamber to the other as the valve member is displaced from its "first" position to its "second" position, thereby limiting the rate of movement of the valve member to the rate at which hydraulic fluid will flow through the orifice means.

7. A "smart vent" valve as in claim 4 further comprising a relatively fixed bracket, a piston element depending from said bracket in axial alignment with the vent opening, and wherein, the valve element comprises a cylinder having a bore in which the piston element is slidingly received and the hydraulic orifice means are effective between the piston element and the bore of the valve element.

8. A "smart vent" valve as in claim 7 further characterized in that the piston element is hollow, the upper end of the piston element is sealed, the lower end of the piston element is closed by an orifice member, thereby defining an upper chamber in said piston, above the orifice member and a lower chamber beneath said orifice member, and orifice means extend through said orifice member to control the rate of flow of hydraulic fluid from the lower chamber into the upper chamber, as the valve element is displaced from its "first" position to its "second" position.

9. A "smart vent" valve as in claim 7 wherein the spring means are effective between the relatively fixed bracket and the valve member.

10. A "smart vent" valve as in claim 8 wherein the valve member comprises a central cylinder portion in which the piston receiving bore is formed and an upwardly open, annular recess, the inner wall of which is formed by said cylindrical portion, and the spring means comprise a compression spring disposed in said annular recess and effective between the bottom of the recess and said relatively fixed bracket.

11. A "smart vent" valve as in claim 10 wherein the valve element further includes an annular disc portion which overlies the upper end of said tubular element, the "first" position of the valve member being defined by engagement of the annular disc portion, under the urging of said compression spring, and "fixed" seal mean, between said disc portion and the upper end of the tubular element, effective in the "first" position of the valve member to seal the vent opening.

12. A "smart vent" valve as in claim 4 wherein the sealing relation between the cylindrical surface of the valve member and the vent opening is provided by a polytetraflouroethylene resin sealing ring.

13. A "smart vent" valve as in claim 12 where the polytetraflouroethylene sealing ring is mounted on the inner surface of the tubular element defining the vent opening, and has an inverted U-shaped cross section.

14. A "smart vent" valve as in claim 7 wherein a plate member extends outwardly of the tubular member defining the vent opening, said relatively fixed bracket overlies the tubular member and plate portion, and further comprising means for pivotally mounting one end of the bracket on the plate member, and means for releasably securing the other end of the bracket to said plate member, whereby the fixed bracket, and the valve member mounted thereon may be swung upwardly and outwardly to provide access to the interior of the tank through the vent opening.

* * * * *